Dec. 20, 1960 G. P. McGRAW, JR 2,965,149
DEVICE FOR SHAPING ARTICLES
Filed July 11, 1958 2 Sheets-Sheet 1
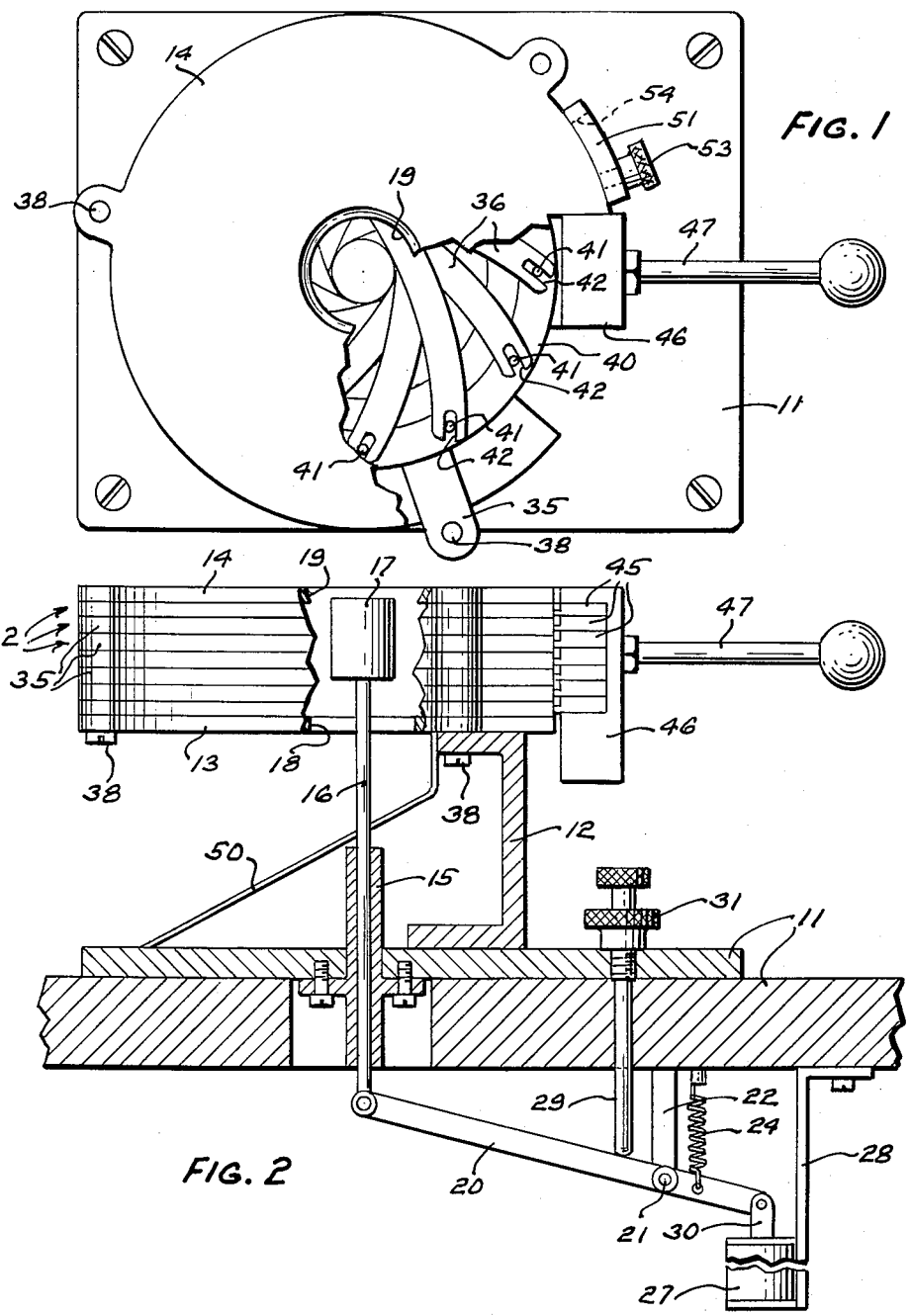
INVENTOR
G. P. McGRAW JR
BY C. B. Hamilton
ATTORNEY Dec. 20, 1960   G. P. McGRAW, JR   2,965,149
DEVICE FOR SHAPING ARTICLES
Filed July 11, 1958   2 Sheets-Sheet 2
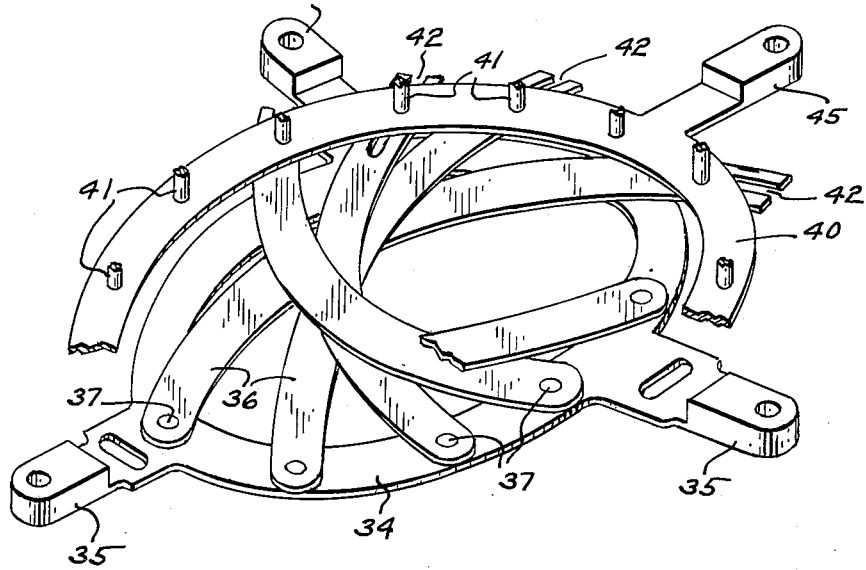
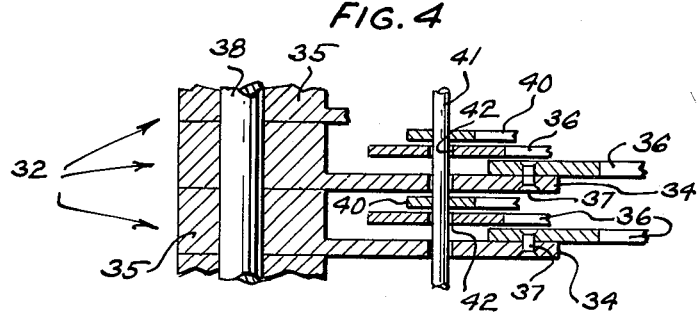
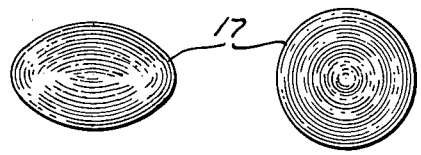
INVENTOR
G. P. McGRAW JR
BY C. B. Hamilton
ATTORNEY

United States Patent Office 2,965,149
Patented Dec. 20, 1960

2,965,149

DEVICE FOR SHAPING ARTICLES

George P. McGraw, Jr., Downers Grove, Ill., assignor to Western Electric Company, Incorporated, New York, N.Y., a corporation of New York Filed July 11, 1958, Ser. No. 747,871

2 Claims. (Cl. 153—32)

This invention relates to devices for shaping articles and more particularly to devices for cylindrically shaping convolutely wound capacitors.

In the manufacture of capacitors, it frequently happens that convolutely wound capacitors are deformed from the desirable cylindrical shape when they are removed from the winding mandrel. In order to insure that the capacitance values are maintained within predetermined limits and that the capacitors are properly sized to assure their fitting into cylindrical cans, it has been found desirable to shape the capacitors into true cylinders.

One of the objects of this invention is to provide a device for cylindrically shaping articles.

Another of the objects of this invention is to provide a device for cylindrically shaping out-of-round articles of different lengths.

Another object of this invention is to provide a device having elements for engaging capacitors of various sizes around the peripheries thereof and cylindrically shaping the capacitors to predetermined diameters.

A further object of this invention is to provide a device having a plurality of elements positioned to define a cylindrical opening of selective adjustable size for receiving a capacitor to be shaped, and means for moving the elements to partially close the opening a predetermined amount for shaping the capacitor.

One embodiment of the present invention contemplates a device for cylindrically shaping out-of-round capacitors wherein the capacitor is placed in an opening defined by a plurality of arcuate elements arranged in spaced circles, each of the elements in each circle being pivoted at one end and actuated at the other end by an annular member which is oscillated by a handle to bring the elements into contact with the periphery of the capacitor to cylindrically shape it. A solenoid is energized to elevate a rod which is adjustable in height to support capacitors of various lengths in the opening. An adjustable stop is provided for limiting movement of the handle to adjust the maximum size of the opening for accommodating capacitors of various sizes.

Other objects and advantages of the invention will become apparent by reference to the following detailed description and the accompanying drawings illustrating a preferred embodiment of the invention, in which:

Fig. 1 is a plan view of an embodiment of the invention with a portion broken away to show the configuration of interleaved elements or leaves which engage and shape a capacitor;

Fig. 2 is a front view of the device with the lowermost portion shown in section for illustrating the arrangement of parts which support the capacitor to be shaped and a stop screw which may be adjusted to vary the extreme positions of the capacitor-supporting parts for accommodating capacitors of different lengths;

Fig. 3 is an enlarged fragmentary perspective view illustrating the construction of one of a plurality of units adapted to shape the capacitor;

Fig. 4 is an enlarged, fragmentary sectional view taken on line 4—4 of Fig. 3 showing portions of several of the shaping units;

Fig. 5 is an end view of an out-of-round convolutely wound capacitor which is to be shaped by the device of the present invention; and Fig. 6 is an end view of the shaped capacitor.

Referring now in detail to the drawings, a base 11 is shown supporting a framework which is made up of a bracket 12, a lower plate 13, and an upper plate 14. A rod 16 slidably mounted in a bushing 15 secured to the base 11 is adapted to engage and support a convolutely wound capacitor 17 on its upper end, the rod 16 extending upwardly through a hole 18 in the lower plate 13 and the capacitor 17 being manually positioned on the rod 16 through a hole 19 in the upper plate 14.

The lower end of the rod 16 is pivotally attached to a lever 20 which is pivoted by a pin 21 to a depending portion 22 of the base 11 (Fig. 2). A tension spring 24 connected between the base 11 and the lever 20 urges the lever in such a direction as to move the rod 16 downward.

A solenoid 27 secured to a depending bracket 28 is provided with a plunger 30 which is pivotally attached to the lever 20 for actuating this lever. The solenoid 27, when energized, moves the lever 20 to raise the rod 16; and the spring 24, when the solenoid 27 is deenergized, moves the lever 20 to lower the rod 16. A stop screw 29 having a locknut 31 is threaded through the base 11 for engaging the lever 20 to adjust the uppermost position to which the rod 16 may be moved, in order to accommodate capacitors of various lengths.

The framework supports a plurality of stacked shaping units 32 secured between the lower and upper plates 13 and 14, which units constitute the portion of the device which serves to shape the capacitor 17. Each of the shaping units 32 is provided with a supporting ring 34 (Fig. 3) having apertured lugs 35 through which bolts 38 are passed to secure the various layers together between the lower and upper plates. Each shaping unit 32 is also provided with a plurality of arcuate leaves or elements 36 which are pivotally attached by pins 37 to the supporting ring 34 at points spaced therearound.

Each shaping unit 32 is also provided with an annular actuating member 40 rotatably movable relative to the ring 34 and having a plurality of pins 41 spaced around the periphery thereof. The pins 41 extend through slots 42 in the elements or leaves 36, the slots 42 being in the ends of the leaves 36 opposite to the ends which are pinned to the ring 34. The ring 34 and the pins 41 cooperate to hold the leaves 36 in a pattern defining a generally circular opening concentric with the holes 18 and 19 in the lower and upper plates 13 and 14. The leaves 36 of all of the layers 32 define a generally cylindrical opening for receiving the capacitor 17 to be shaped.

Each of the annular actuating members 40 is provided with an apertured lug 45 through which a bolt is passed to secure all of the lugs 45 within a bracket 46. The bracket 46 is provided with a handle 47 for facilitating movement of the annular actuating members 40 relative to the supporting rings 34. Movement of the annular actuating members 40 pivots the leaves 36 to vary the size of the opening defined by the leaves. A slanted sheet metal member 50 (Fig. 2) positioned beneath the hole 18 in the lower plate 13 deflects the shaped capacitor 17 to one side when it drops through the hole 18.

A stop 51, adjustably secured to the lower plate 13 by a thumb screw 53 extending through an elongated slot 54 in the stop 51 and threaded into the lower plate, engages the bracket 46 to limit movement of the annular actuating members 40 in a counterclockwise direction (Figs. 1 and 3) to thereby limit the maximum opening defined by the leaves 36. The stop 51 is positioned so that the maximum opening defined by the leaves 36 is slightly larger than the capacitor 17 to be shaped in order that the leaves will hold the capacitor in a substantially vertical position prior to the time when the handle 47 is moved clockwise (Figs. 1 and 3) for the shaping operation. This adjustable stop 51 controls the size of the opening defined by the leaves 36 to take care of capacitors of different sizes.

In operating the device to shape convolutely wound capacitors, the handle 47 is moved to its extreme counterclockwise position, this being determined by the position of the stop 51; and the solenoid 27 is energized to elevate the rod 16, the uppermost position of the rod being determined by the position of the stop screw 29. The operator then manually drops a capacitor 17 through the hole 19 in the upper plate 14 onto the upper end of the rod 16, the leaves 36 serving to retain the capacitor in a substantially vertical position.

The operator then moves the handle 47 in a clockwise direction (Figs. 1 and 3) to rotate the annular actuating members 40 relative to the supporting rings 34 to decrease the size of the opening defined by the leaves 36. The leaves 36, during movement of the handle, engage the periphery of the capacitor 17 and force it into a cylindrical shape.

With the handle 47 held in its extreme clockwise position, the solenoid 27 is deenergized to permit the rod 16 to be moved by the spring 24 to its lowermost position. The operator then moves the handle 47 counterclockwise against the stop 51, thereby opening the leaves 36 and permitting the shaped capacitor 17 to drop through the hole 18 in the lower plate 13 onto the member 50 which deflects the capacitor to one side of the device.

The solenoid 27 is then energized to elevate the rod 16 and the above procedure is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for reshaping an out-of-round, deformable capacitor, which device comprises a base, a framework mounted on the base, a plunger mounted on the base and extending upwardly for supporting such a capacitor, means on the base for raising and lowering the plunger, a plurality of support rings attached to the framework and spaced one above the other in stacked alignment, a plurality of actuating rings interleaved with and spaced from the support rings, said actuating rings being designed for limited oscillatory rotation relative to the support rings, a plurality of flat, arcuate leaves associated with each of the support rings and pivoted at one end thereof to the respective support rings at uniformly spaced intervals therearound, each of said arcuate leaves being provided at the other end thereof with an elongated slot, a plurality of pins secured to the actuating rings at uniformly spaced intervals therearound and extending through corresponding slots in corresponding arcuate leaves, the arcuate leaves associated with each support ring being arranged in interleaved fashion one upon the other for pivotal movement in planes parallel to the plane of said support ring and with contiguous edges of the arcuate leaves defining a substantially circular aperture concentric with the associated support ring, the several circular apertures thus formed being aligned vertically to define a substantially cylindrical opening surrounding the capacitor supported by the plunger, and means for rotating said actuating means in unison relative to the support members so as to cause the pins to pivot all of the leaves simultaneously to decrease the effective diameter of the cylindrical opening by an amount sufficient to reshape the out-of-round capacitor to a desired cylindrical form.

2. A device for reshaping out-of-round, deformable articles, which device comprises an annular support member, a plurality of flat, arcuate leaves, means pivotally connecting one end of each of said arcuate leaves individually to the annular support member at uniformly spaced points therearound, actuating means movable relative to the support member and operatively connected to the other end of each of the arcuate leaves, said arcuate leaves being arranged in interleaved fashion one upon another for pivotal movement in planes substantially parallel to the plane of the support member and with contiguous edges of the arcuate leaves defining a substantially circular, central opening concentric with respect to the support member, means for holding an out-of-round article to be reshaped in said central opening, and means for moving said actuating means so that all of the arcuate leaves pivot simultaneously in the same direction to decrease the effective diameter of the opening and force the article to assume a substantially circular cross section.

References Cited in the file of this patent

UNITED STATES PATENTS

| | | |
|---|---|---|
| 758,195 | Schweinert | Apr. 26, 1904 |
| 1,423,224 | Klein | July 18, 1922 |
| 1,469,763 | Snyder | Oct. 2, 1923 |
| 1,678,119 | Klein | July 24, 1928 |
| 2,225,345 | Lamoreaux | Dec. 17, 1940 |
| 2,291,803 | Grotnes | Aug. 4, 1942 |
| 2,578,229 | Clement | Dec. 11, 1951 |